US010703294B2

(12) United States Patent
Dellock et al.

(10) Patent No.: US 10,703,294 B2
(45) Date of Patent: Jul. 7, 2020

(54) REMOVABLE ROOF RAIL ASSEMBLY AND METHOD OF USE

(71) Applicant: FORD GLOBAL TECHNOLOGIES, LLC, Dearborn, MI (US)

(72) Inventors: Paul Kenneth Dellock, Northville, MI (US); Roger Petrey, Rochester Hills, MI (US); Travis S. Garland, Milford, MI (US); Talat Karmo, Waterford, MI (US); Harry Lobo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 14 days.

(21) Appl. No.: 15/910,576

(22) Filed: Mar. 2, 2018

(65) Prior Publication Data

US 2019/0270413 A1  Sep. 5, 2019

(51) Int. Cl.
    | | |
    |---|---|
    | *B60R 9/00* | (2006.01) |
    | *B60R 9/058* | (2006.01) |
    | *E05B 73/00* | (2006.01) |
    | *E05B 85/06* | (2014.01) |
    | *F16B 21/12* | (2006.01) |
    | *B60R 9/04* | (2006.01) |

(52) U.S. Cl.
    CPC .............. *B60R 9/058* (2013.01); *B60R 9/04* (2013.01); *E05B 73/00* (2013.01); *E05B 85/06* (2013.01); *F16B 21/125* (2013.01)

(58) Field of Classification Search
    CPC .......... B60R 9/058; E05B 73/00; E05B 85/06; F16B 21/125
    See application file for complete search history.

(56) References Cited

U.S. PATENT DOCUMENTS

| | | | |
|---|---|---|---|
| 5,794,826 A | 8/1998 | Cronce et al. | |
| 6,216,928 B1 | 4/2001 | Blankenburg et al. | |
| 7,458,490 B2 | 12/2008 | Klinkman et al. | |
| 7,721,925 B1 | 5/2010 | Graffy et al. | |
| 8,028,875 B2 | 10/2011 | Kmita et al. | |
| 8,348,111 B2 | 1/2013 | Heuchert et al. | |
| 8,720,761 B2 | 5/2014 | Binder et al. | |
| 8,960,734 B2 | 2/2015 | Camp | |
| 9,371,041 B2 | 6/2016 | Almhill et al. | |
| 9,718,410 B2 | 8/2017 | Cropley et al. | |
| 2015/0152665 A1 | 6/2015 | Camp | |

FOREIGN PATENT DOCUMENTS

| | | |
|---|---|---|
| CN | 105083139 B | 1/2013 |
| CN | 204161225 U | 2/2015 |
| GB | 2488771 A | 9/2012 |

OTHER PUBLICATIONS

English Machine Translation of CN204161225U.
(Continued)

*Primary Examiner* — Peter N Helvey
(74) *Attorney, Agent, or Firm* — David Coppiellie; King & Schickli, PLLC

(57) ABSTRACT

A removable roof rail assembly for a motor vehicle includes a roof rail and latch assembly for securing the roof rail to the motor vehicle. The latch assembly includes a push button actuator to conveniently and efficiently release the latch assembly and allow one to remove the roof rail from the motor vehicle. A related method for selectively securing a roof rail to and removing a roof rail from the motor vehicle is also provided.

14 Claims, 4 Drawing Sheets

(56) References Cited

OTHER PUBLICATIONS

English Machine Translation of CN105083139B.
"Rhino-Rack Roof Rail Roof Rack for Ford Everest"; L.A. Car Accessories; http://www.lacaraccessories.com/online-store/4x4-accessories/rhino-rack-cross-bar/rhino-rack-roof-rail-roof-rack-for-ford-everest-detail.html; pp. 1-3.
"Pacific Steel Roof Bars for Vauxhall Zafira MK II 2005-2011 without Roof Rails"; Vauxhall Zafira; https://www.ebay.ie/itm/Pacific-Steel-Roof-bars-for-Vauxhall-Zafira-Mk-II-2005-2011-Without-Roof-Rails/361376555207?hash=item5423b8a0c7:g:oicAAOSwH05ZtoRS; pp. 1-3.
"Removable Mount REX Series Roof Rack for Hyundai Santa Fe with Roof Rails"; ROLA; https://www.amazon.com/59766-Removable-Mount-Hyundai-Santa/dp/B009QRWHZO; p. 1 of 1.

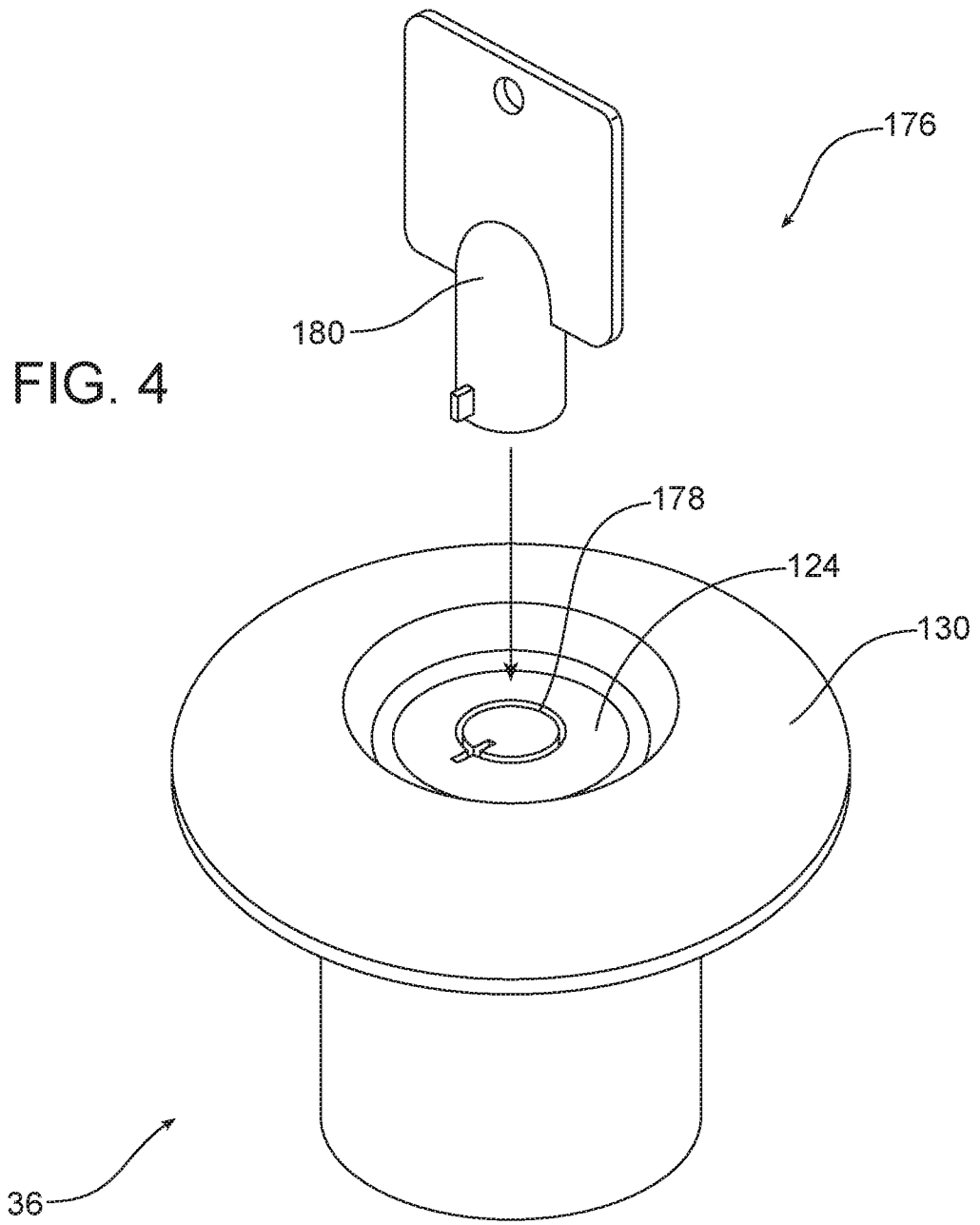

REMOVABLE ROOF RAIL ASSEMBLY AND METHOD OF USE

TECHNICAL FIELD

This document relates generally to the motor vehicle equipment field and, more particularly, to a new and improved removable roof rail assembly as well as to a related method for selectively securing a roof rail to and removing a roof rail from a motor vehicle.

BACKGROUND

Many motor vehicle owners want their motor vehicle to be equipped with a roof rack or roof rail system which allows one to more easily transport cargo on the roof of a motor vehicle. Ideally, each roof rail assembly of the roof rack or roof rail system is removable so that they may be removed from the roof of the motor vehicle when not in use. This allows the motor vehicle owner to lessen aerodynamic drag of the vehicle and thereby improve fuel economy.

This document relates to a new and improved removable roof rail assembly that allows a motor vehicle owner to conveniently and efficiently secure a roof rail to and remove a roof rail from the roof of a motor vehicle.

SUMMARY

In accordance with the purposes and benefits described herein, a removable roof rail assembly is provided for a motor vehicle. That removable roof rail assembly comprises a roof rail and a latch assembly securing the roof rail to the motor vehicle. That latch assembly includes a push button actuator that may be used to quickly and efficiently release the latch assembly and allow the removal of the roof rail from the motor vehicle in the most convenient manner.

More specifically, the roof rail includes at least one foot. Further, the latch assembly may include a latch mechanism, carried on the at least one foot and a locking pin carried on the motor vehicle. The locking pin may be secured to a roof reinforcement of the motor vehicle. That roof reinforcement may be selected from a group of structures consisting of a roof support and a hydroformed roof support tube.

The locking pin may extend through an aperture in a roof of said motor vehicle. In one possible embodiment, the roof includes a well receiving the locking pin and the latch mechanism of the latch assembly. A removable cover may be secured to the foot to conceal the latch mechanism.

That latch mechanism may also include an outer housing receiving the push button actuator and an inner housing received in the push button actuator. Still further, a plurality of apertures may be provided in the inner housing and a plurality of retaining balls may be received in the plurality of apertures. In addition, a removable roof rail assembly may include a locking plunger received in the inner housing and a first spring biasing the locking plunger toward an entry opening of a locking pin receiver in the inner housing. In addition, a second spring may extend between the push button actuator and the inner housing. That second spring may bias the push button actuator toward a home position.

The removable roof rail assembly may further include a push button locking feature securing the push button actuator in the home position and preventing release of the latch assembly. In this way it is possible to secure the removable roof rail assembly from theft. In one of the many possible embodiments, the push button locking feature may include a key receiver provided in the push button and a key configured for receipt in the key receiver.

In accordance with an additional aspect, a new and improved method is provided for selectively securing a roof rail to and removing that roof rail from a motor vehicle. That method comprises the steps of aligning the latch mechanism carried on one of the roof rail and the motor vehicle with a locking pin carried on the other of the roof rail and the motor vehicle and engaging the locking pin in the latch mechanism in order to secure the roof rail to the motor vehicle. In one particularly useful embodiment, the latch mechanism is carried on the roof rail and the locking pin is carried on the motor vehicle.

The method may further include the step of depressing a push button actuator on the latch mechanism to release the locking pin and remove the roof rail from the motor vehicle. Further, the method may include the step of unlocking a push button locking feature before depressing the push button to release the locking pin.

Still further, the method may include the step of lifting the roof rail from the motor vehicle after depressing the push button in order to separate the latch mechanism from the locking pin. Still further, the method may include the step of inserting the locking pin into a locking receiver and capturing the locking pin with a plurality of retaining balls of the latch mechanism when engaging the locking pin in the latch mechanism.

In the following description, there are shown and described several preferred embodiments of the removable roof rail assembly as well as the related method for selectively securing the roof rail to and removing the roof rail from the motor vehicle. As it should be realized, the removable roof rail assembly and related method are capable of other, different embodiments and their several details are capable of modification in various, obvious aspects all without departing from the removable roof rail assembly and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the removable roof rail assembly and the related method and together with the description serve to explain certain principles thereof.

FIG. 4 is a perspective view of an alternative embodiment of the latch assembly incorporating a push button locking feature to secure the removable roof rail assembly against theft.

Reference will now be made in detail to the present preferred embodiments of the removable roof rail assembly, examples of which are illustrated in the accompanying drawing figures.

DETAILED DESCRIPTION

Figure 1:
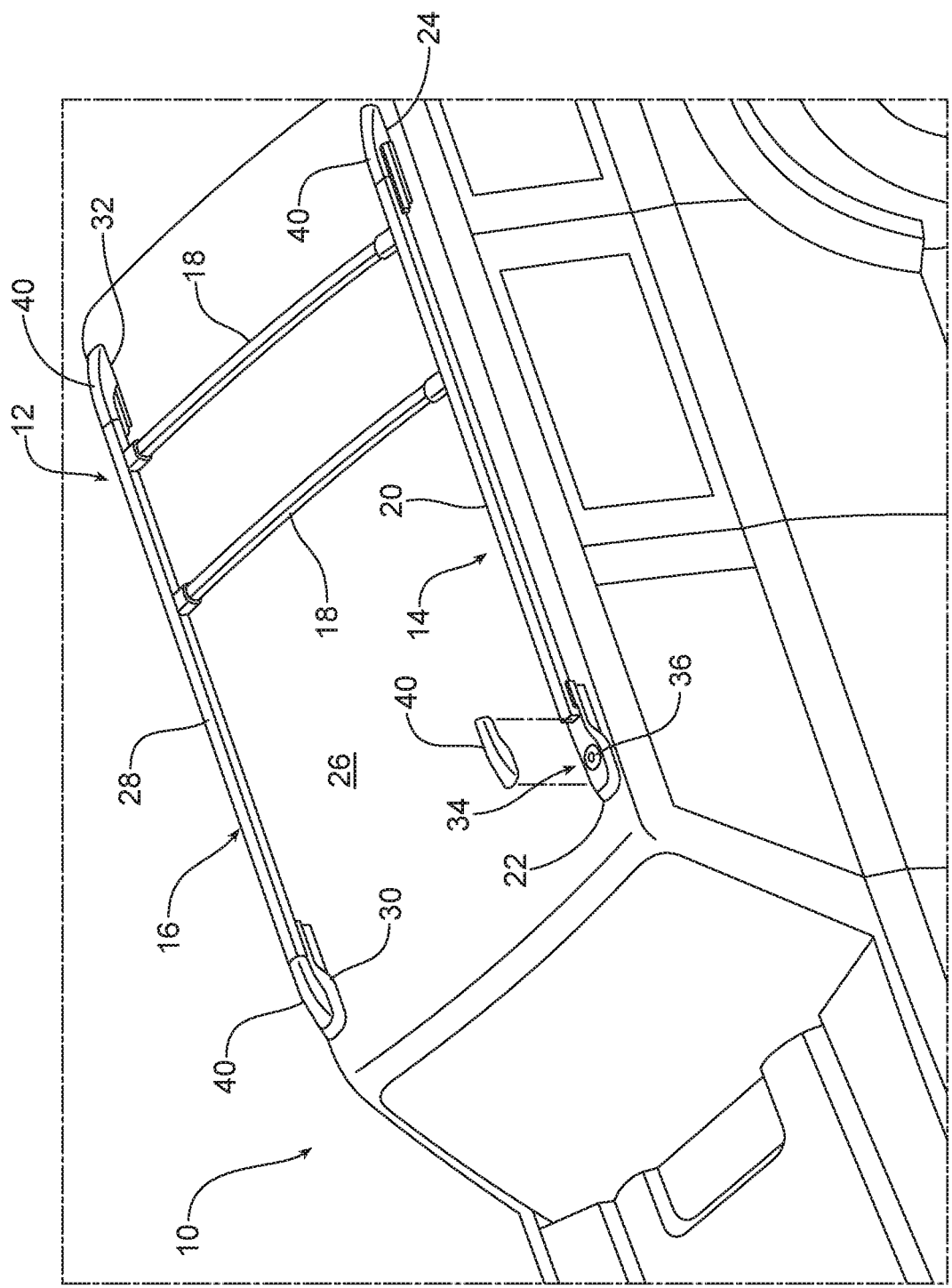
FIG. 1 is a detailed perspective view of a motor vehicle incorporating a roof rack or removable rail system that includes two removable roof rail assemblies.

Reference is now made to FIG. 1 illustrating a motor vehicle 10 equipped with a removable roof rack or removable roof rail system 12. That removable roof rail system 12 includes a first removable roof rail assembly 14, a second removable roof rail assembly 16 and two adjustable crossbars 18 extending between the first removable roof rail assembly and the second removable roof rail assembly.

The first removable roof rail assembly 14 includes a roof rail 20 having a first foot 22 at one end and a second foot 24 at the opposite end that engage the roof 26 of the motor vehicle 10. Similarly, the second removable roof rail assembly 16 includes a roof rail 28 having a first foot 30 at a first end and a second foot 32 at a second end for engaging the roof 26 of the motor vehicle 10.

A latch assembly 34 secures each foot 22, 24, 30, 32 and, therefore, each roof rail 20, 28 to the roof 26 of the motor vehicle 10. Each latch assembly 34 includes a latch mechanism 36 and a cooperating locking pin 38. Each latch mechanism 36 may be concealed inside a removable cover 40 of the related roof rail 20, 28. In FIG. 1, the removable cover 40 at the foot 22 is removed to expose the latch mechanism 36 of that foot to view. The other removable covers 40 on the feet 24, 30 and 32 are secured in place to conceal the latch assemblies at those feet. Each cover 40 may be connected to the associated foot 22, 24, 30, 32 by resilient snap clips or other appropriate means (not shown).

Figure 2:
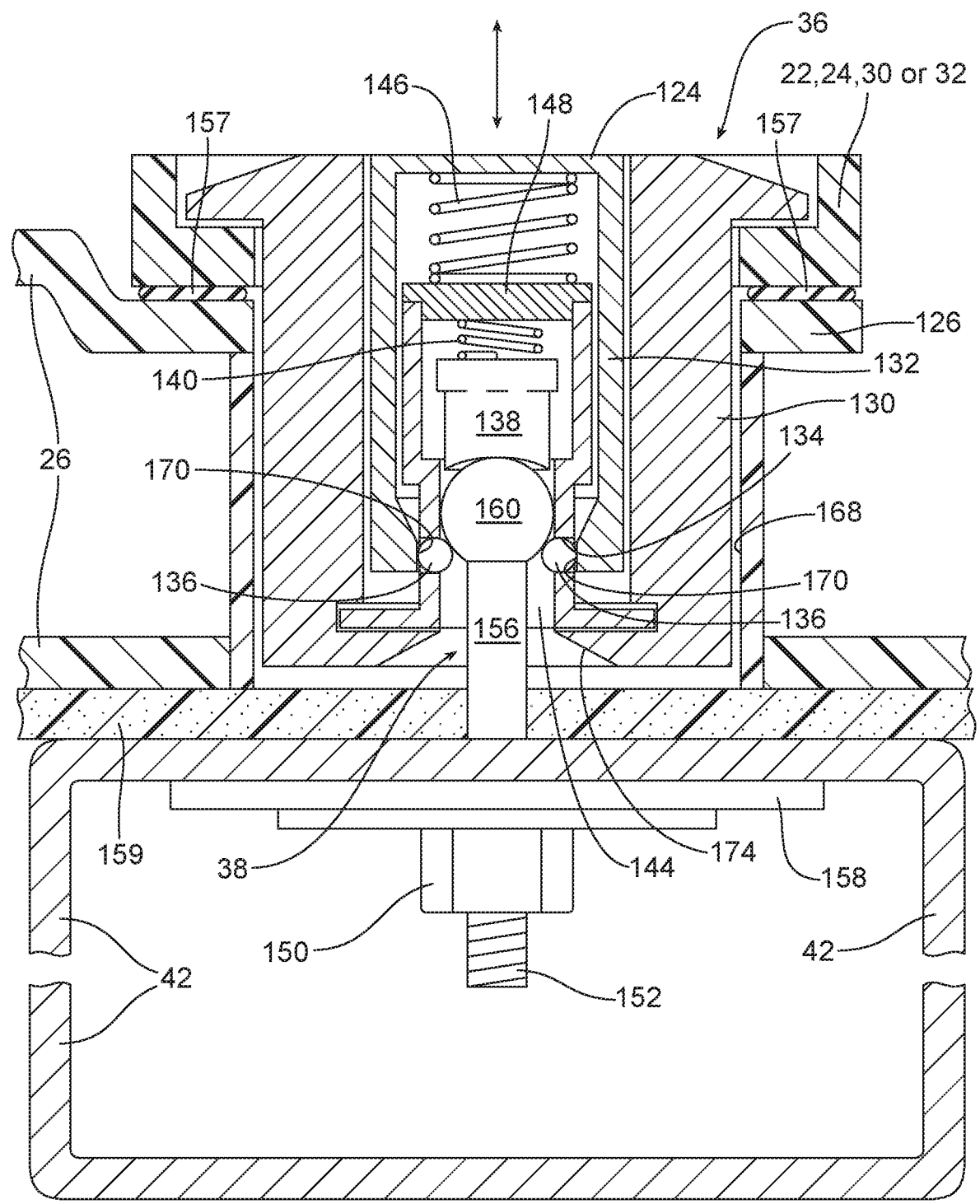
FIG. 2 is detailed cross-sectional view of the latch assembly utilized to secure the roof rail to the motor vehicle that illustrates the latch assembly in a latched configuration.
Figure 3:
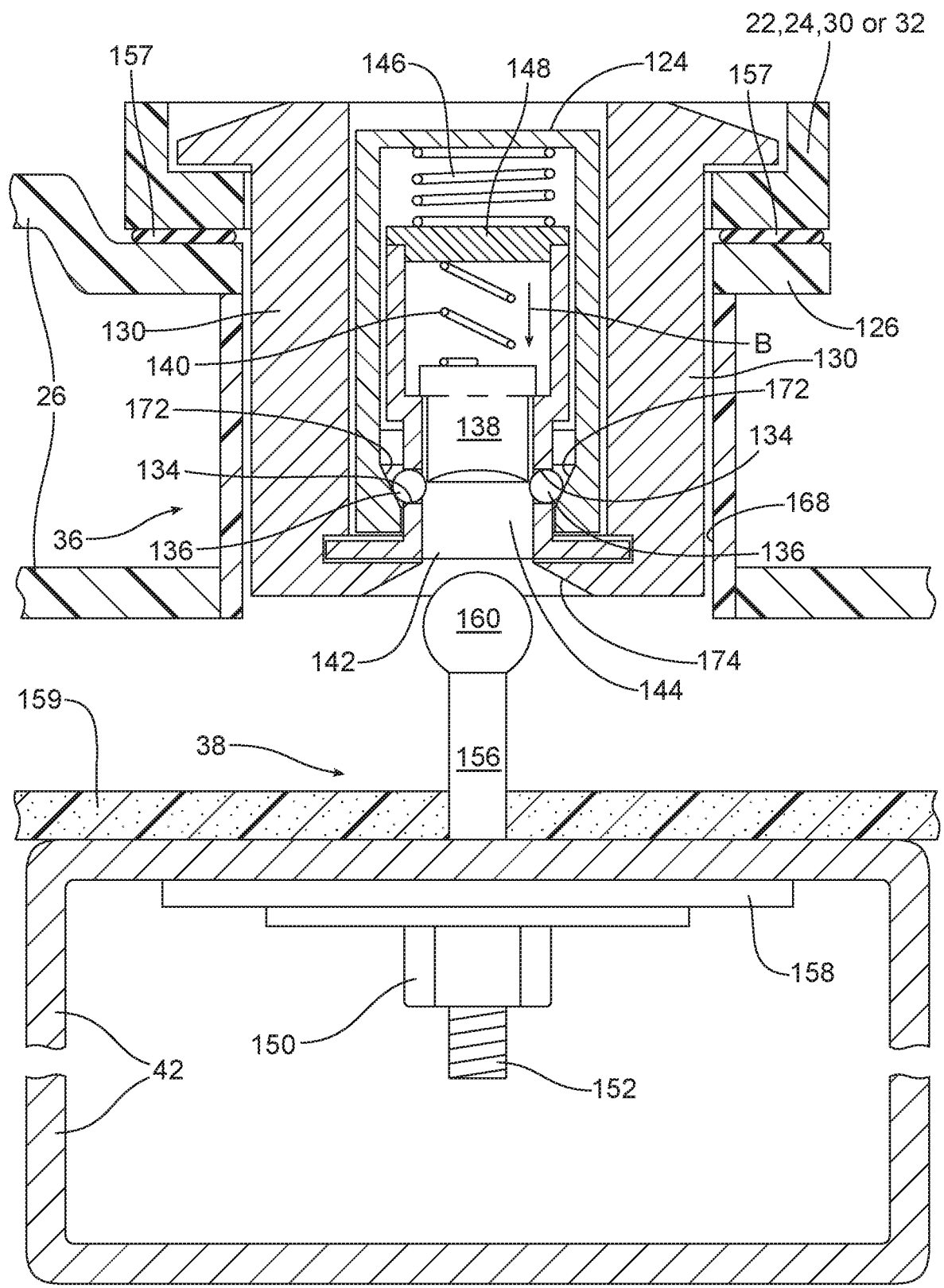
FIG. 3 is a view similar to FIG. 2 but illustrating the latch assembly in an unlocked or unlatched configuration.

Reference is now made to FIGS. 2 and 3 which illustrate in detail each of the latch assemblies 34. Each latch assembly 34 includes a latch mechanism 36 carried on the associated foot 22, 24, 30, 32 and a cooperating locking pin 38 carried on the motor vehicle 10 and, more particularly, secured to a roof reinforcement 42 of the motor vehicle. The roof reinforcement 42 may comprise a roof support such as a box beam or a hydroformed roof support tube.

As illustrated, latch mechanism 36 includes an outer housing 130 that receives the push button actuator 124 and an inner housing 132 received within the push button actuator. A plurality of apertures 134 are aligned and radially arrayed around the inner housing 132. A plurality of retaining balls 136 are freely received in the plurality of apertures 134.

A locking plunger 138 is received in the inner housing 132. A locking plunger spring 140 biases the locking plunger 138 toward the entry opening 142 of a locking pin receiver 144 in the inner housing 132. A return spring 146 extends between the push button actuator and the cap 148 of the inner housing 132. As will be appreciated from the following description, the return spring 146 functions to bias the push button actuator 124 toward a home position that is illustrated in drawing FIG. 2.

The operation of each latch assembly 34 will now be described in detail. As illustrated, each locking pin 38 includes a shank 156 having a base and mounting flange 158 at a proximal end and an enlarged head 160 at a distal end. The mounting flange 158 is fixed to the roof reinforcement 42 by welding, a fastener or any other appropriate means. Note nut 150 secured to threaded end 152 of locking pin 38 in FIGS. 2 and 3 of the illustrated embodiment. A well 168 is provided in the roof panel 12. The locking pin 38 extends thorough an aperture (not shown) in the roof reinforcement and projects into the well 168 which is sized and shaped to receive the outer housing 130 of the latch mechanism 36. The roof rail assemblies 14, 16 are fixed in position by engaging the locking pins 38 in each of the cooperative latch mechanisms 36 at each foot 22, 24, 30, 32. See FIG. 2. More specifically, the projecting and enlarged head 160 of each locking pin 38 is received in the locking pin receiver 144 of each latch mechanism 36. The enlarged head 160 is engaged against the locking plunger 138 and captured in the locking pin receiver 144 between the locking plunger 138 and the retaining balls 136 which are held in a position projecting inward against the enlarged head 160 by the bearing surface 170 of the push button actuator 124.

When properly seated and latched in position, a seal 157 on the foot 22, 24, 30, 32 provides a weather tight seal with the roof 26 around the well 168. Foam rubber or an elastic material 159 provided between the roof reinforcement 42 and the roof 26 prevents squeaks where the roof 26 is a removable roof panel.

When one wishes to release and detach the removable roof rail assemblies 14, 16 from the motor vehicle 10, one must press the push button actuator 124 of each of the latch mechanisms 36. FIG. 3 illustrates the push button actuator 124 in the depressed position. In this position, the sloped cam surface 172 along the inner wall of the push button actuator 124 is aligned with the retaining balls 136 and the apertures 134. This creates clearance for the outward movement of the retaining balls 136 into the apertures 134 as the locking plunger spring 140 biases the locking plunger 138 in the direction of action arrow B. As the locking pin is withdrawn from the latching mechanism 126 in the direction of action arrow B, the retaining balls 136 are pushed radially outward providing clearance for the enlarged head 160 of the locking pin 38 to pass out of the locking pin receiver 144 thereby freeing the removable roof rail assemblies 14, 16 from the roof 26. Upon release, each push button actuator 124 is returned to the home position illustrated in FIG. 2 by operation of the return spring 146.

When one wishes to again fix the removable roof rail assemblies 14, 16 to the roof 26 of the motor vehicle 10, one aligns the removable roof rail assemblies so that the locking pin receiver 144 of the latch mechanism 126 at each foot 22, 24, 30, 32 is aligned with the cooperating locking pins 38 fixed to the roof reinforcement 42. The tapered entry 174 provided in the outer housing 130 that converges toward the locking pin receiver 144 aids in the proper aligning of the feet 22, 24, 30, 32 of the removable roof rail assemblies 14, 16 with the roof 26. Once aligned, one lowers the removable roof rail assemblies 14, 16 toward the roof 26, dropping the latch mechanisms 36 into the wells 168 and forcing the enlarged heads 160 of each locking pin against the force of the locking plunger springs 140 until the enlarged heads 160 snap past the retaining balls 136 and are again locked in position.

As illustrated in FIG. 4, one or more of the latch mechanisms 36 that secure each removable roof rail assembly 14, 16 in position may include a locking feature 176 to prevent theft. As illustrated in FIG. 4, that locking feature 176 may include a key receiver 178 integrated into the push button actuator 124 and a cooperating key 180 configured for receiving and unlocking of the locking feature. When the locking feature 176 is locked, the push button actuator 124 is secured in the home position with the retaining balls 136 biased radially inward to securely hold the enlarged head 160 of the locking pin 38 in the locking pin receiver 144 of the latch mechanism 36 thereby preventing theft of the removable roof rail assembly 14, 16. Such a push button locking feature 176 is known in the art.

The removable roof rail assembly 14 or 16 may be used in a method for selectively securing a roof rail 20, 28 to and removing that roof rail from a motor vehicle 10. That method comprises aligning a latch mechanism 36 carried on the roof rail assembly 14 or 16 with a locking pin 38 carried on the motor vehicle 10 and engaging the locking pin in the latch mechanism in order to secure the roof rail to the motor vehicle.

The method may further include the step of depressing a push button actuator 124 on the latch mechanism 36 to release the locking pin 38 and remove the roof rail assembly 14 or 16 from the roof 26 of the motor vehicle.

The method may include the step of unlocking a push button locking feature 176, as illustrated in FIG. 4, before depressing the push button actuator 124 to release the locking pin.

In addition the method may include the step of lifting the roof rail 20, 28 from the roof 26 of the motor vehicle 10 in order to separate the latch mechanism 36 from the locking pin 38. Still further, the method may include the step of inserting the locking pin 38 into a locking pin receiver 144 of the latch mechanism 36 and capturing the locking pin with a plurality of retaining balls 136 of the latch mechanism when engaging the locking pin in the latch mechanism.

The foregoing has been presented for purposes of illustration and description. It is not intended to be exhaustive or to limit the embodiments to the precise form disclosed. Obvious modifications and variations are possible in light of the above teachings. For example, in the illustrated embodiment the latch mechanism 36 is carried on the roof rail assembly 14 or 16 and the locking pin 38 is carried on the motor vehicle 10. In other possible embodiments, the latch mechanism 36 may be carried on the motor vehicle 10 while the locking pin 38 is carried on the roof rail assembly 14, 16. All such modifications and variations are within the scope of the appended claims when interpreted in accordance with the breadth to which they are fairly, legally and equitably entitled.

What is claimed:

1. A removable roof rail system for a motor vehicle, comprising:
   a first roof rail;
   a second roof rail; and
   a crossbar extending between said first roof rail and said second roof rail wherein said first roof rail and said second roof rail both include at least one foot engaging a roof of said motor vehicle and a latch assembly securing said first roof rail and said second roof rail to said motor vehicle, said latch assembly including a push button actuator to release the latch assembly and remove the first roof rail and the second roof rail from said motor vehicle.

2. The removable roof rail system of claim 1, wherein said latch assembly includes a latch mechanism, including said push button actuator, and a locking pin carried on said motor vehicle.

3. The removable roof rail system of claim 2, wherein said locking pin is secured to a roof reinforcement of said motor vehicle.

4. The removable roof rail system of claim 3, wherein said roof reinforcement is selected from a group of structures consisting of a roof support and a hydroformed roof support tube.

5. The removable roof rail system of claim 4, wherein said locking pin extends through an aperture in a roof of said motor vehicle.

6. The removable roof rail system of claim 5, wherein said roof includes a well receiving said locking pin and said latch mechanism.

7. The removable roof rail system of claim 6, further including a removable cover that is secured to said roof to conceal said latch mechanism.

8. The removable roof rail system of claim 2, wherein said latch mechanism includes an outer housing receiving said push button actuator and an inner housing received in said push button actuator.

9. The removable roof rail system of claim 8, including a plurality of apertures in said inner housing and a plurality of retaining balls received in said plurality of apertures.

10. The removable roof rail system of claim 9, including a locking plunger received in said inner housing and a first spring biasing said locking plunger toward an entry opening of a locking pin receiver in said inner housing.

11. The removable roof rail system of claim 10, including a second spring extending between said push button actuator and said inner housing, said second spring biasing said push button actuator toward a home position.

12. The removable roof rail system of claim 11, further including a push button locking feature securing said push button actuator in said home position and preventing release of said latch assembly.

13. The removable roof rail system of claim 12, wherein said push button locking feature includes a key receiver and a key configured for receipt in said key receiver.

14. A removable roof rail system for a motor vehicle, comprising:
   a first roof rail;
   a second roof rail;
   a crossbar extending between said first roof rail and said second roof rail; and
   a latch assembly securing said first roof rail to said motor vehicle, said latch assembly including a push button actuator to release said latch assembly and remove said roof rail from said motor vehicle, wherein said latch assembly includes a latch mechanism including said push button actuator, carried on said first roof rail, and a cooperating locking pin carried on said motor vehicle.

* * * * *